United States Patent

Lyman et al.

[11] Patent Number: 5,238,489
[45] Date of Patent: Aug. 24, 1993

[54] LEACHING/FLOTATION SCRAP TREATMENT METHOD

[75] Inventors: Jane W. Lyman, Salt Lake City; Glenn R. Palmer, Layton, both of Utah

[73] Assignee: The United States of America as represented by the Secretary of the Interior, Washington, D.C.

[21] Appl. No.: 906,517

[22] Filed: Jun. 30, 1992

[51] Int. Cl.$^5$ .............................. C01G 5/00
[52] U.S. Cl. ...................................... 75/743
[58] Field of Search ........................... 75/743

[56] References Cited

U.S. PATENT DOCUMENTS

| | | | |
|---|---|---|---|
| 3,692,671 | 9/1972 | Recht et al. | 210/45 |
| 3,812,232 | 5/1974 | Bauer et al. | 423/21 |
| 4,612,047 | 9/1986 | Schmidt et al. | 420/83 |
| 4,636,353 | 1/1987 | Seon et al. | 420/416 |
| 4,979,987 | 12/1990 | Mason | 75/743 |
| 5,129,945 | 7/1992 | Lyman et al. | 423/263 |

FOREIGN PATENT DOCUMENTS 62-187112 8/1987 Japan.

OTHER PUBLICATIONS

Chemical Abstracts; vol. 108, #2; 108: 9628s Permanent magnet alloys.
Chemical Abstracts; vol. 108, #4; 108: 25000m Recovery of rare earth metals from iron-alloy scrap.
Chemical Abstracts: Vol. 108, #14; 108: 115079y Recovery of rare earth elements from rare earth element-iron type magnetic alloy.
Chemical Abstracts; vol. 112, #6; 112: 40110y Solubility of samarium sulfate and neodymium sulfate in sulfate solutions.
"Recovery of Metal Values from NdFeB Magnet Scrap"; J. W. Morrison and G. R. Palmer; Williamsburg, Va., Oct. 28–Nov. 1, 1990 17 pages.
"Metallurgical Review of MMIJ"; vol. 6, No. 2; Nov. 1989 Hideaki Seto and Takao Mori; pp. 139–162.
"The History of Permanent Magnet Materials"; J. D. Livingston; Feb., 1990; pp. 30–34.

*Primary Examiner*—Peter D. Rosenberg
*Attorney, Agent, or Firm*—Flynn, Thiel, Boutell & Tanis

[57] ABSTRACT

A method of treating a mixture of $Nd_2Fe_{14}B$ and $SmCo_5$ alloy scrap or waste particulates wherein the mixture is introduced to a bath of sulfuric acid solution to selectively dissolve the $Nd_2Fe_{14}B$ alloy particulates, leaving a majority of the $SmCo_5$ alloy particulates undissolved. Hydrogen bubbles are generated in the bath by dissolution of the $Nd_2Fe_{14}B$ alloy particulates. The undissolved $SmCo_5$ alloy particulates adhere to the hydrogen bubbles are floated to the bath surface to form a froth containing a concentrate of the $SmCo_5$ alloy particulates, which are recovered by removing the concentrate from the bath surface. The bath is treated to recover the Nd metal of the dissolved $Nd_2Fe_{14}B$ alloy particulates. Any grinding media present in the mixture settles to the bottom of the bath to further upgrade the recovered alloy product.

15 Claims, 1 Drawing Sheet

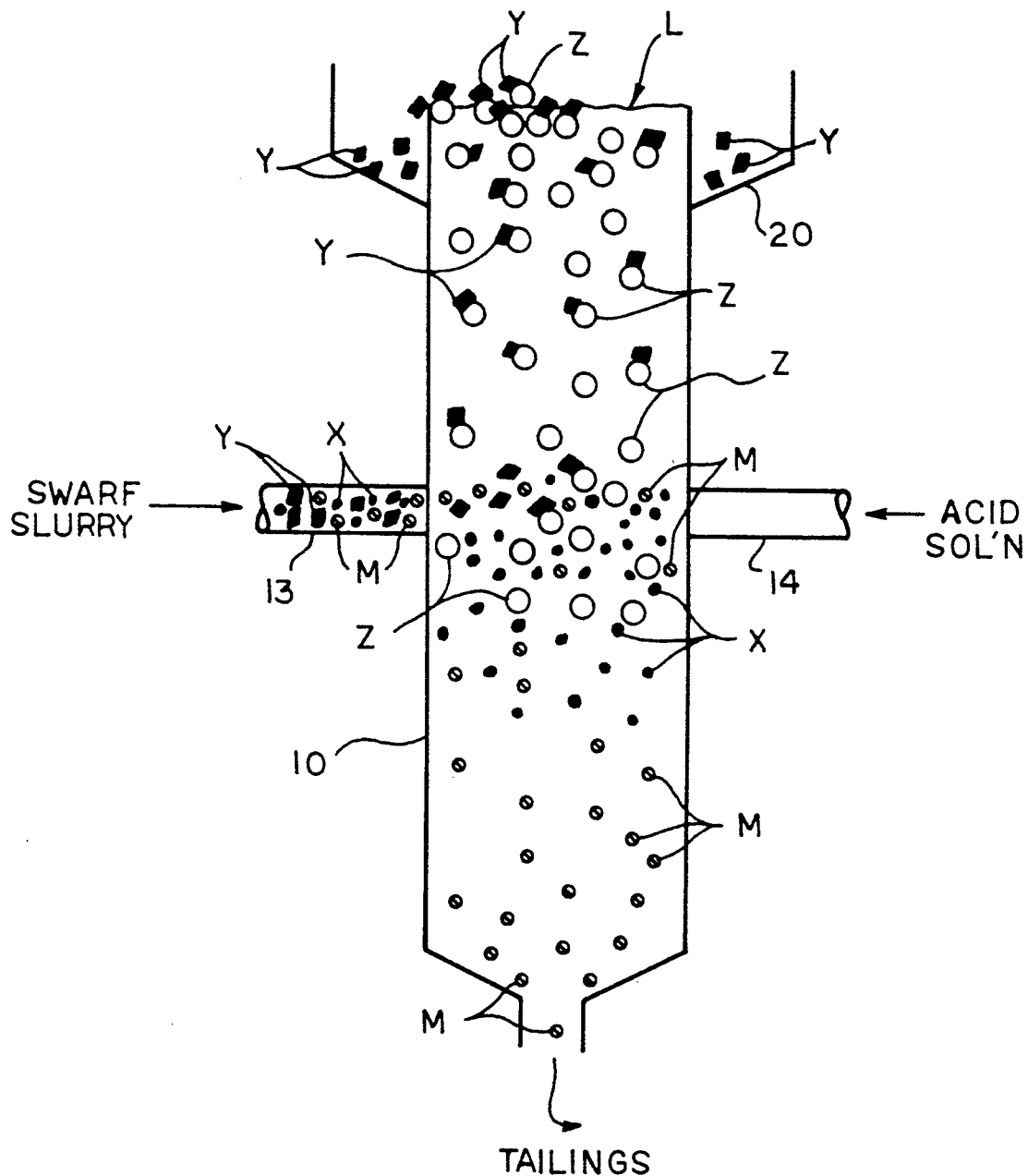

LEACHING/FLOTATION SCRAP TREATMENT METHOD

FIELD OF THE INVENTION

The present invention relates to the treatment of mixed alloy scrap or waste particulates such as, for example, mixed rare earth alloy swarf, to separate and recover discrete metals/alloys present therein.

BACKGROUND OF THE INVENTION

Rare earth-cobalt metal alloys, developed by 1970, exhibited much greater magnetic energy products and coercivities than previously available with Alnico or ferrite magnets. These alloys were found to be useful in magnetic components requiring miniaturization such as those used in miniature portable stereo headphones and tape players, as well as computers, motors and audio visual components.

With cost and supply problems associated with cobalt, however, another group of alloys based on rare earth-iron-boron compositions were developed during the early 1970's. This alloy is described by Schmidt et al in U.S. Pat. No. 4,612,047 issued Sep. 16, 1986 and by Seon et al in U.S. Pat. No. 4,636,353 issued Jan. 13, 1987. The alloys (e.g., $Nd_2Fe_{14}B$) exhibit highly desirable magnetic properties for use as permanent magnets.

The commercialization of these rare earth-transition metal alloys has progressed to the point that relatively large quantities of rare earth-transition metal alloy scrap or waste particulates have been generated from the various manufacturing operations used to fabricate the alloys into suitable magnet components, electrical components and the like. The rare earth-transition metal alloy scrap or waste generated by the industries involved varies considerably in form from dry, bulky relatively large scrap pieces to a fine powder or dust referred to as "swarf" usually produced by abrasive grinding and cutting operations employed to fabricate the aforementioned components. Swarf is typically contaminated with grinding media particulates which come from the abrasive wheels and/or belts.

In addition to fabricating rare earth-transition metal alloy (e.g., $Nd_2Fe_{14}B$ and $SmCo_5$), these same industries may also fabricate traditional magnet alloys such as AlNiCo, and ferrite and the like and thereby also generate large quantities of these types of alloy scrap or waste particulates.

In practice, these different types of alloy scrap or waste particulates oftentimes are disposed of using a common scrap or waste disposal system such that a mixed alloy scrap or waste particulates by-product is generated (i.e., the by-product includes a mixture of different rare earth-bearing alloy particulates along with grinding media particulates). Industries that generate such mixed alloy scrap or waste by-product require some method to dispose of the by-product and to separate and recover the different valuable rare earth metals/alloys present therein.

An object of the present invention is to provide a method of treating a contaminated mixed alloy scrap or waste particulates by-product in a manner to separate and recover discrete metals/alloys present in the mixed by-product.

Another object of the present invention is to provide a method of treating a mixed alloy scrap or waste particulates by-product using combined differential leaching/flotation to separate and recover discrete metals/alloys present in the mixed by-product.

SUMMARY OF THE INVENTION

The present invention involves a method of treating a mixture of first and second alloy particulates (for example, mixed rare earth alloy scrap or waste particulates by-product with grinding media contamination) wherein the mixture is contacted with an acid leaching bath such that the first alloy particulates are selectively dissolved in the bath, leaving a majority of the less reactive second alloy particulates along with any grinding media particulates present undissolved in the bath. Gas bubbles are formed in the bath while the more reactive first alloy particulates are dissolved such that the undissolved second alloy particulates are floated to the bath surface on the bubbles to form a floating concentrate of the second alloy particulates. The floating concentrate is removed from the bath surface to recover the second alloy particulates. The undissolved and non-floating grinding media particulates sink to the bottom of the bath where they can be recovered. The bath pregnant with the dissolved first alloy particulates is treated to recover one or more metals of the first alloy particulates. Also one or more metals of any second alloy particulates dissolved in the bath can be recovered if desired.

In one embodiment of the invention, the mixture of first and second alloy particulates plus grinding media particulates are introduced to the acid bath while the particulates have residual oil, coolant or other water-soluble organic material thereon that alters the surface chemistry of each solid constituent and provides for the selective dissolution of the first alloy particulates relative to the less reactive second alloy and grinding media particulates and further provides for the adherence of the second alloy particulates to the gas bubbles formed during the acid digestion in the bath.

In treating a mixture of first and second rare earth alloy scrap or waste particulates, the method of the present invention comprises introducing the mixture in a bath of sulfuric acid and water (i.e., a sulfuric acid solution) that selectively dissolves the first rare earth alloy particulates, leaving a majority of the second rare earth alloy particulates and grinding media particulates undissolved. Hydrogen bubbles are formed in the bath by dissolution of the first rare earth alloy particulates to which bubbles the undissolved second rare earth alloy particulates adhere and are floated to the bath surface to form a floating concentrate of the second rare earth alloy particulates. The floating concentrate is removed from the bath surface to recover the second rare earth alloy particulates. The bubbles do not attach to the grinding media particulates so they sink to the bottom of the vessel for subsequent recovery. The pregnant bath is treated to recover a rare earth metal (e.g., Nd) and optionally a transition metal (e.g., Fe) of the first rare earth alloy particulates dissolved therein.

In one embodiment of the invention, the weight ratio of particulates to sulfuric acid to water is preferably selected from about 1:1:9.5 to about 1:3:8.5. This weight ratio range is necessary to prevent the formation of rare earth or transition metal precipitates in the leach solution.

Illustrative of one embodiment of the invention is a method of treating a mixture of $Nd_2Fe_{14}B$, $SmCo_5$ alloy scrap and waste particulates, with grinding media particulates wherein the mixture is introduced to a bath comprising a sulfuric acid solution to selectively dissolve the $Nd_2Fe_{14}B$ alloy particulates, leaving a majority of the less reactive $SmCo_5$ alloy particulates and grinding media particulates undissolved. Hydrogen bubbles are generated in the bath by dissolution of the $Nd_2Fe_{14}B$ alloy particulates. The undissolved $SmCo_5$ alloy particulates are floated to the bath surface on the bubbles to form a floating concentrate of the $SmCo_5$ alloy particulates, which are recovered by removing the floating concentrate from the bath surface. The grinding media particulates settle to the bottom of the container for recovery. The pregnant bath is treated by solvent extraction steps to recover the Nd metal of the dissolved $Nd_2Fe_{14}B$ alloy particulates and any dissolved Sm metal of the $SmCo_5$ alloy particulates, or both rare earths may be precipitated as rare-earth, double salt sulfates. Dissolved Fe of the $Nd_2Fe_{14}B$ alloy particulates can also be recovered by treating the pregnant bath.

The aforementioned objects and advantages of the invention will become more readily apparent from the following detailed description.

DESCRIPTION OF THE DRAWINGS

The FIGURE is a schematic view of apparatus for practicing one embodiment of the method of the invention.

DETAILED DESCRIPTION OF THE INVENTION

The invention involves treating a mixture of first and second alloy particulates with grinding media contaminants by combined differential leaching/flotation to recover and purify desired metals/alloys present in the mixture. For purposes of illustration, the invention will be described herebelow with respect to treating a mixed rare earth alloy scrap or waste particulates by-product resulting from, for example, fabrication operations used to form permanent magnets. However, the invention is not limited to treating mixed rare earth scrap or waste particulates and can be practiced to treat other contaminated mixed alloy particulates that are separable and recoverable by the combined leaching/flotation method of the present invention.

In treating mixed rare earth alloy scrap or waste particulates by-product resulting from magnet fabrication operations, the mixed particulates by-product is typically received from one or more fabricating operations, either on-site or off-site, as so-called "swarf" which comprises fine powder or particulates having a particle size of less than −20 mesh. "Swarf" is typically produced by such magnet fabrication operations as abrasive cutting and grinding. The swarf includes grinding or cutting media such as SiC or $Al_2O_3$ particulates mixed with the different rare earth scrap or waste particulates.

An illustrative mixed rare earth alloy swarf received from magnet fabrication operations for treatment in accordance with the invention comprises $Nd_2Fe_{14}B$ powder (−20 mesh size), $SmCo_5$ powder (−20 mesh size) and SiC and $Al_2O_3$ grinding media (−20 mesh size). An average $Nd_2Fe_{14}B/SmCo_5$ swarf mixture comprises, by weight %, 4.2% Al, 0.5% B, 14% Co, 0.5% Cu, 37.2% Fe, 16.8% Nd, 0.4% Ni, and 7.0% Sm.

The swarf mixture typically is received with the $Nd_2Fe_{14}B$ particulates (first particulates), the $SmCo_5$ particulates (second particulates), and grinding media particulates covered with residual water-soluble organic oils and/or coolants which are employed in the previous magnet fabrication operations (i.e., abrasive grinding and cutting).

In accordance with one embodiment of the method of the invention, the mixed rare earth alloy scrap or waste particulates by-product (i.e., the aforementioned illustrative mixed alloy swarf) is introduced to an acid leaching bath contained in a suitable leaching/flotation vessel such that the $Nd_2Fe_{14}B$ alloy particulates are selectively and substantially dissolved while a majority of the less reactive $SmCo_5$ alloy particulates and grinding media contaminants are undissolved.

For example, the FIGURE illustrates schematically a leaching/flotation vessel 10 to which is introduced a swarf slurry (swarf particles and water) through conduit 13 and the acid leaching solution through conduit 14 to form a leaching bath S in the vessel 10. The acid leaching solution is introduced through conduit 14 at a rate to maintain a constant upper surface level L of leaching bath in the vessel 10 and a substantially constant bath pH.

In particular, the illustrative mixed alloy swarf is slurried with water and introduced to a solution of sulfuric acid and water (i.e., a sulfuric acid solution) wherein the weight ratio of swarf to sulfuric acid to water is maintained preferably at about 1:2:9. This preferred ratio corresponds to 100 grams of mixed alloy swarf in one liter of 2-molar sulfuric acid solution. The leaching operation does not require external heating of the acid leaching bath for efficient leaching of the $Nd_2Fe_{14}B$ particulates fraction of the swarf.

In this embodiment of the invention, the weight ratio of illustrative mixed alloy swarf to acid to water can vary from about 1:1:9.5 (i.e., 100 grams swarf in one liter of 1-molar sulfuric acid solution) up to about 1:3:8.5 (i.e., 100 grams swarf in one liter of 3-molar sulfuric acid solution).

The reaction or leaching time to dissolve the more reactive $Nd_2Fe_{14}B$ alloy particulates typically is about 8 minutes, although the reaction time can be varied from 4 to 15 minutes. In 1-molar sulfuric acid solution, the preferred leaching time is about 15 minutes. In 1.5-molar sulfuric acid solution, the preferred leaching time is about 12 minutes.

As mentioned, when the mixed alloy swarf is introduced to the acid leaching bath S, the more reactive $Nd_2Fe_{14}B$ alloy particulates X are dissolved preferentially to the less reactive $SmCo_5$ alloy particulates Y. For example, substantially all of the $Nd_2Fe_{14}B$ alloy particulates X are dissolved whereas a majority (e.g., 80 weight %) of the $SmCo_5$ alloy particulates Y remain undissolved by the leaching acid. Some minor amount of the $SmCo_5$ alloy particulates may dissolve in the leaching acid but the dissolved amount comprises only a minor portion (e.g., 20 weight %) of the total Sm present in the initial by-product. The selective (differential) dissolution of the $Nd_2Fe_{14}B$ alloy particulates relative to the $SmCo_5$ alloy particulates is based primarily on differences in surface chemistry response between the different alloy particulates, although Applicants do not intend to be bound by any particular theory to explain the differential dissolution behavior of the different alloy particulates involved. The presence on the scrap or waste alloy particulates of the aforementioned water-soluble organic oils and/or coolants (organic material) used in the previous magnet fabrication operations enhances the differential dissolution behavior of the alloy particulates involved. Any grinding media M, such as SiC and $Al_2O_3$ particulates, present in the by-product are undissolved and sink to the bottom of the leaching vessel 10 as tailings where they can be separated from the leach solution by conventional filtration. A pump (not shown) may be optionally used at the bottom of the vessel 10 to facilitate removal of the tailings of the grinding media.

As the $Nd_2Fe_{14}B$ alloy particulates fraction of the mixed alloy swarf dissolves selectively in the acid solution or bath, hydrogen gas bubbles Z are formed in-situ in the solution. This generation of hydrogen gas bubbles is important for separating out the undissolved $SmCo_5$ particulates fraction of the mixed alloy swarf. In particular, the undissolved $SmCo_5$ alloy particulates Y have been found to preferentially adhere to the hydrogen gas bubbles Z and to be floated to the upper bath surface where a froth is formed having a increased concentration of the $SmCo_5$ alloy particulates compared to the initial mixed alloy swarf. The presence of the aforementioned oils and/or coolants on the scrap or waste particulates enhances the adherence of the $SmCo_5$ to the hydrogen bubbles. The invention envisions generating gas bubbles in the bath artificially, such as by bubbling hydrogen or other gas through the bath, to augment the in-situ generated gas bubbles.

The floating froth is removed from the acid leaching bath surface by simple overflow of the froth to a separate collection container 20 positioned adjacent the leaching vessel 10, FIGURE. However, other conventional techniques may be employed to separate or remove the concentrate-bearing froth from the surface of the acid leaching bath. For example, such techniques as vacuum suction or paddles may be used to this end.

The froth comprises a concentrate of the undissolved $SmCo_5$ alloy particulates. For example, when the aforementioned illustrative mixed $Nd_2Fe_{14}B/SmCo_5$ swarf is dissolved in the preferred sulfuric acid leaching bath described hereabove for 10 minutes, the concentrate was found to comprise, in weight %, 3.2% Al, 0.05% B, 42% Co, 0.4% Cu, 5.2% Fe, is significantly upgraded or enriched in terms of the Sm concentration as compared to the initial mixed alloy swarf (e.g., 18.9 weight % Sm in the concentrate versus 7.0 weight % Sm in the swarf). The same is true with respect to the Co concentration (e.g., 42 weight % in the concentrate versus 14 weight % in the swarf).

Grinding media tailings separated from the pregnant acid leaching bath (solution) by conventional filtration techniques were analyzed and found to comprise in weight %, 28.6% Al, 0.04% B, 0.9% Co, 0.04% Cu, 1.9% Fe, 0.1% Nd, 0.2% Ni, and 0.4% Sm.

The separated concentrate was found to contain the following weight percentages of the initial mixed alloy swarf: 23.8% of the Al, 3.5% of the B, 87.5% of the Co, 85.1% of the Cu, 6.2% of the Fe, 3.0% of the Nd, 53.66% of the Ni, and 73.4% of the Sm. The tailings were found to contain the following weight percentages of the initial mixed alloy swarf: 70.6% of the Al, 0.9% of the B, 0.6% of the Co, 2.39% of the Cu, 0.75% of the Fe, 0.1% of the Nd, 7.2% of the Ni, and 0.55% of the Sm.

In this same example, the sulfuric acid leaching bath pregnant with dissolved alloy particulates was found to contain the following weight percentages of the initial mixed alloy swarf: 5.6% of the Al, 95.6% of the B, 11.9% of the Co, 12.5% of the Cu, 93.1% of the Fe, 96.9% of the Nd, 39.2% of the Ni, and 26.1% of the Sm.

Thus, the pregnant liquor is greatly enriched in Nd and Fe, and enriched to some extent in Sm.

This pregnant sulfuric acid leaching bath is treated to separate and recover the dissolved Nd and also the dissolved Sm. For example, the pregnant leaching bath is subjected to solvent extraction/selective stripping steps using conventional equipment effective to separate and recover the dissolved Nd and Sm. In particular, pregnant acid leaching bath is subjected to an initial extraction step using Di (2-ethylhexyl) phosphoric acid as an acidic organic extractant followed by selective stripping of the individual rare earth values from the organic phase (loaded with Nd and Sm) using mineral acid, such as HCl. The strip solution then is treated with oxalic acid to precipitate oxalates of the rare earths and the oxalate precipitate is heated to produce oxides from which Nd and Sm can be recovered by known metallothermic chlorination-reduction or fused salt electrolysis. The separation and recovery of the dissolved Nd and Sm from the pregnant acid leaching bath can be conducted using the extraction/selective stripping steps described in U.S. Pat. No. 3,812,232, the teachings of which are incorporated herein by reference. Also see U.S. Pat. No. 4,016,737 where Di(2-ethylhexyl) monothiophosphoric acid is used for extraction under high loading of metal ions in the feed solution without gel formation. Solvent extraction and ion exchange techniques useful in practicing the invention also are described by Seto and Mori in "The Separation and Purification of Rare-Earth Elements--Solvent Extraction and Ion-Exchange Chromtography", Metallurgical Review of MMIJ, Vol. 6, No. 2, 1989, pp. 139-162 to separate and recover the dissolved Nd and Sm constituents. Since the dissolved Nd constituent is greatly concentrated in the pregnant leaching bath relative to the dissolved Sm constituent, the number of solvent extraction steps necessary to separate the Nd and Sm constituents is significantly reduced in practice of the present invention.

Alternately, the pregnant bath can be treated by alkali element or ammonium hydroxide to precipitate Nd and Sm as rare earth, double salt sulfates as described by the present inventors in allowed copending U.S. patent application Ser. No. 602,491, now U.S. Pat. No. 5,129,945 entitled "Scrap Treatment Method", the teachings of which are incorporated herein by reference.

The Fe constituent of the pregnant leaching bath can be separated and recovered by techniques described by Morrison and Palmer in "Recovery of Metal Values from NdFeB Magnet Scrap", Second International Symposium—"Recycling of Metals and Engineered Materials", ed. J. H. Van Linden, D. L. Stewart, and Y. Sahai, pp. 593-609, TMS, Warrendale, Pa. (1990) and by the present inventors in aforementioned allowed copending U.S. application Ser. No. 602,491, now U.S. Pat. 5,129,945 where dissolved Fe is removed as iron jarosite.

Although the present invention has been described hereabove with respect to leaching the mixed rare earth alloy swarf in a sulfuric acid leaching bath or solution, the invention is not so limited and can be practiced using other leaching mineral acids such as, for example, HCl and $HNO_3$. In the event other leaching acids are used, the subsequent treatment of the pregnant leaching bath or solution to separate and remove the dissolved Nd, Sm, Fe, etc. constituents (or other metals present)

would be achieved using recovery techniques selected appropriate for the particular leaching acid used.

Moreover, although the present invention has been described hereabove with respect to treating a mixed rare earth alloy swarf (e.g., mixed $Nd_2Fe_{14}B/SmCo_5$ alloy swarf), the invention is not so limited and can be practiced to treat mixed particulates of other alloys that are amenable to separation and recovery using the combined differential leaching/flotation method of the invention.

While the invention has been described in terms of specific embodiments thereof, it is not to be limited thereto but rather only to the extent set forth in the following claims.

We claim:

1. A method of treating a mixture of first and second metal particulates, comprising:
   a) contacting the mixture and an acid bath such that the first alloy particulates are selectively dissolved in the bath, leaving a majority of the second alloy particulates undissolved in said bath,
   b) forming gas bubbles in said bath while said first alloy particulates are dissolved therein such that the undissolved second alloy particulates are floated to the bath surface on said bubbles to form a floating concentrate of said second alloy particulates,
   c) removing the floating concentrate from the bath surface to recover said second alloy particulates, and
   d) treating said bath to recover a metal of said first alloy particulates dissolved in said bath.

2. The method of claim 1 wherein the mixture is introduced to a bath comprising a sulfuric acid solution.

3. The method of claim 1 wherein said gas bubbles are formed in said bath as a result of dissolution of said first alloy particulates in said bath.

4. The method of claim 1 further including treating said bath to recover a metal of said second alloy particulates that may be dissolved in said bath.

5. The method of claim 1 including introducing said mixture to said bath while said particulates have residual organic material thereon that enhances selective dissolution in said bath of said first alloy particulates relative to said second alloy particulates.

6. The method of claim 1 including removing from said bath any grinding media present initially in said mixture and remaining undissolved in said bath.

7. A method of treating a mixture of first and second rare earth alloy scrap or waste particulates, comprising:
   a) contacting the mixture and an acid bath such that the first rare earth alloy particulates are selectively dissolved in the bath, leaving a majority of the second rare earth alloy particulates undissolved in said bath,
   b) forming hydrogen bubbles in said bath by dissolution of said first rare earth alloy particulates such that the undissolved second rare earth alloy particulates are floated to the bath surface on said bubbles to form a floating concentrate of said second rare earth alloy particulates,
   c) removing the floating concentrate from the bath surface to recover said second rare earth alloy particulates, and
   d) treating said bath to recover a rare earth metal of said first rare earth alloy particulates dissolved in said bath.

8. The method of claim 7 wherein the mixture is placed in a bath comprising a sulfuric acid and water.

9. The method of claim 8 wherein the weight ratio of said particulates to acid to water is from about 1:1:9.5 to about 1:3:8.5.

10. The method of claim 7 further including treating said bath to recover a rare earth metal of said second alloy particulates that may be dissolved in said bath.

11. The method of claim 7 including placing said mixture in said bath while said particulates have residual organic material thereon that enhances selective dissolution in said bath of said first rare earth alloy particulates relative to said second rare earth alloy particulates.

12. A method of treating a mixture of $Nd_2Fe_{14}B$ and $SmCo_5$ alloy scrap or waste particulates, comprising:
   a) introducing the mixture to a bath of sulfuric acid and water to selectively dissolve the $Nd_2Fe_{14}B$ alloy particulates, leaving a majority of the $SmCo_5$ alloy particulates undissolved in said bath,
   b) forming hydrogen bubbles in said bath by dissolution of said $Nd_2Fe_{14}B$ alloy particulates such that the undissolved $SmCo_5$ alloy particulates are floated to the bath surface on said bubbles to form a floating concentrate of said $SmCo_5$ alloy particulates,
   c) removing the floating concentrate from the bath surface to recover said $SmCo_5$ alloy particulates, and
   d) treating said bath to recover the Nd metal of said $Nd_2Fe_{14}B$ alloy particulates dissolved in said bath.

13. The method of claim 12 wherein the weight ratio of said particulates to acid to water is from about 1:1:9.5 to about 1:3:8.5.

14. The method of claim 12 further including treating said bath to recover the Sm metal of said $SmCo_5$ alloy particulates that may be dissolved in said bath.

15. The method of claim 12 including removing from said bath any grinding media present initially in said mixture and remaining undissolved in said bath.

* * * * *

UNITED STATES PATENT AND TRADEMARK OFFICE
CERTIFICATE OF CORRECTION

PATENT NO. : 5 238 489
DATED : August 24, 1993
INVENTOR(S) : Jane W. LYMAN, et al It is certified that error appears in the above-identified patent and that said Letters Patent is hereby corrected as shown below:

Column 7, line 18; after "metal" insert ---alloy---.

Signed and Sealed this

Fifteenth Day of March, 1994

Attest:

BRUCE LEHMAN

*Attesting Officer*     *Commissioner of Patents and Trademarks*